T. G. Otterson,
Fruit Jar.
No. 4,211. Reissued Dec. 20. 1870.
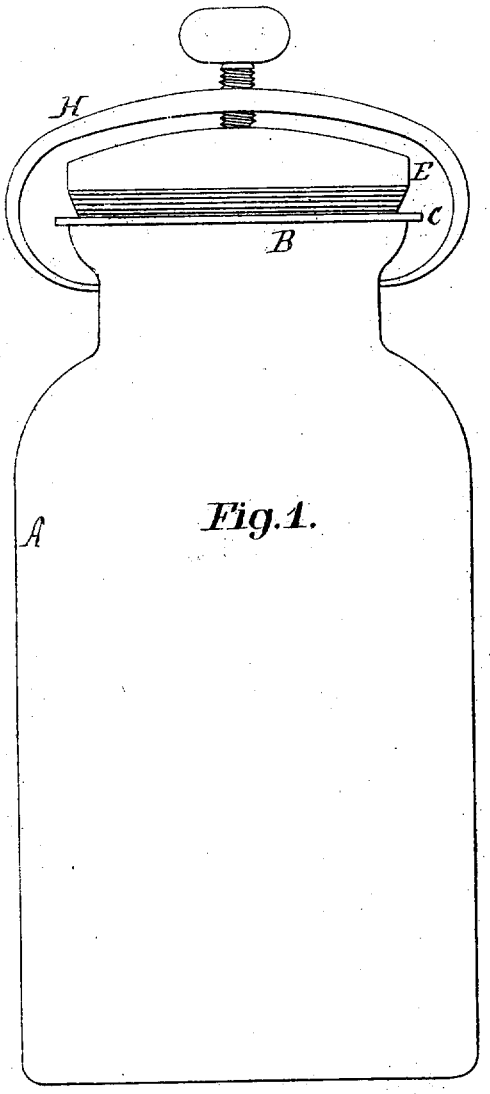
Fig. 1.
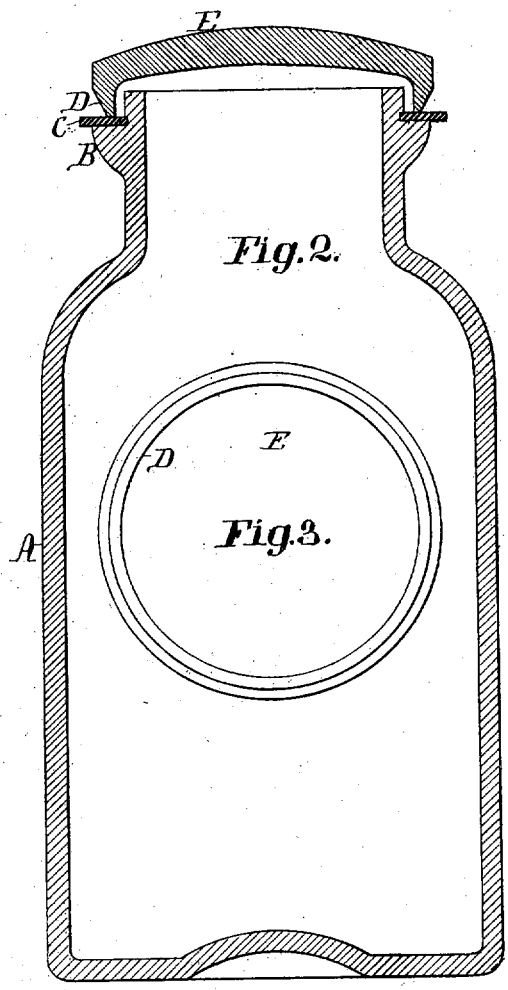
Fig. 2.
Fig. 3.
Witnesses { Wm. A. Steel. Jno. B. Harding.
T. G. Otterson. by his Attys. Howson and Son.
N. PETERS, PHOTO-LITHOGRAPHER, WASHINGTON, D. C.

UNITED STATES PATENT OFFICE.

THOMAS GARRISON OTTERSON, OF PHILADELPHIA, PENNSYLVANIA, ASSIGNOR TO S. B. ROWLEY.

IMPROVEMENT IN FRUIT-JARS.

Specification forming part of Letters Patent No. 36,853, dated November 4, 1862; Reissue No. 2,977, dated June 9, 1868; Reissue No. 4,211, dated December 20, 1870.

*To all whom it may concern:*

Be it known that I, THOMAS G. OTTERSON, of the city of Philadelphia, Pennsylvania, formerly of Millville, New Jersey, am the inventor of a certain Improved Fruit-Jar, (for which Letters Patent of the United States were granted to me on the 4th day of November, 1862, the said Letters Patent having been subsequently surrendered, and reissued Letters Patent for the said invention granted to Salmon B. Rowley, of the said city of Philadelphia, as my assignee, by mesne assignments;) and the following is a specification of my said invention.

My invention consists of a jar having in its exterior a groove or recess formed below the mouth and immediately above an exterior shoulder, and a cover adapted to slip over the portion of the neck of the jar between the mouth and the shoulder and bear directly upon the packing-ring, so that the latter may be compressed between the shoulder and the cover without turning the cover upon the packing-ring.

In the accompanying drawings, Figure 1 is an exterior view of a jar made in accordance with my said invention; Fig. 2, a vertical section; and Fig. 3 represents the under side of the flanged cover of the jar.

A represents a glass jar, the body of which may be made in the form shown in the drawings, or in any desired form. In the jar illustrated in the drawings there is an enlargement or flange, B, in such a position on the exterior of the neck as to form below the mouth an exterior shoulder for receiving the packing-ring C, of gum-elastic or other suitable material. Immediately above this shoulder is formed a circular groove or recess of such character and size that the inner portion of the packing-ring C may be received and fit snugly therein, the lower part of the said groove or recess forming a continuation of the shoulder, so that the packing-ring, after being expanded when placed over the mouth, will, when it rests upon the shoulder, contract and enter the said groove or recess. The latter thus serves to maintain the ring in its proper position and bearing on the shoulder. The portion of the neck of the jar which projects above the shoulder is overlapped by the rim D of a cover, E, which is constructed of sufficiently larger diameter internally than the neck of the jar which it overlaps to allow of its being slipped directly downward over the neck and pressed directly upon the packing-ring, which is supported by the shoulder with its inner edge in the recess. The said rim D of the cover is in the present instance beveled, so that its lower edge may be narrow, and thus effectually indent the packing-ring.

In the jar shown in the drawings the cover is caused to bear on and compress the packing by an ordinary yoke, H, provided with a thumb-screw, which bears upon the center of and exerts vertical pressure upon the top of the cover; but it is obvious that this vertical pressure may be obtained by a variety of devices.

It is evident the cover may be applied to and removed from the packing-ring without being twisted or turned thereupon, and that it bears upon the packing-ring with a direct pressure only, so that the ring is not rubbed, twisted, wrinkled, or displaced from its lodgment in the groove or recess of the jar, as would be the case if the cover were constructed so that it could not be applied to the jar and packing-ring without screwing or otherwise forcibly turning it upon the said packing-ring. Consequently sufficient pressure may be exerted upon the cover to secure a tight joint without diminishing the efficacy of the groove or recess of the jar as a means of retaining the packing in its proper position on the shoulder, and as there is no destructive frictional action upon the packing it may be of that light, elastic, and yielding kind best adapted to be compressed by the cover.

I wish it to be understood that I do not desire to claim, broadly, as my invention a cover having an overlapping rim and resting upon a packing on an exterior shoulder formed below the mouth of the jar; nor do I desire to confine the claim to any specific mode of securing the cover to the jar; but

I claim as my invention—

A fruit-jar having the following features: a groove or recess in the exterior of the neck below the mouth, the bottom of said groove or recess forming a continuation of an exterior shoulder on the jar, and a cover overlapping that portion of the jar above the said shoulder, and adapted to bear upon and compress a packing-ring resting upon the said shoulder, and being applicable to and removable from the packing-ring without turning thereon.

In testimony whereof I have signed my name to this specification in the presence of two subscribing witnesses.

THOMAS GARRISON OTTERSON.

Witnesses:

J. M. COLGAN,

F. B. RICHARDS.